United States Patent
Chu et al.

(10) Patent No.: US 10,660,358 B2
(45) Date of Patent: May 26, 2020

(54) METHOD FOR PRODUCING LOW-SUGAR-CONTENTS JUICE

(71) Applicant: FOOD INDUSTRY RESEARCH AND DEVELOPMENT INSTITUTE, Hsinchu (TW)

(72) Inventors: Chung-Liang Chu, Hsinchu (TW); Ta-Ching Cheng, Hsinchu (TW); Yu-Chuan Tseng, Hsinchu (TW)

(73) Assignee: Food Industry Research and Development Institute, Hsinchu (TW)

( * ) Notice: Subject to any disclaimer, the term of this patent is extended or adjusted under 35 U.S.C. 154(b) by 184 days.

(21) Appl. No.: 15/600,291

(22) Filed: May 19, 2017

(65) Prior Publication Data

US 2018/0110255 A1    Apr. 26, 2018

(30) Foreign Application Priority Data

Oct. 26, 2016  (TW) .............. 105134532 A

(51) Int. Cl.
| | |
|---|---|
| A23L 33/135 | (2016.01) |
| A23L 29/00 | (2016.01) |
| A23L 2/84 | (2006.01) |
| A23L 2/02 | (2006.01) |
| A23L 33/20 | (2016.01) |

(52) U.S. Cl.
CPC .............. *A23L 33/135* (2016.08); *A23L 2/02* (2013.01); *A23L 2/84* (2013.01); *A23L 29/06* (2016.08); *A23L 33/20* (2016.08)

(58) Field of Classification Search
CPC .......... A23L 33/135; A23L 29/06; A23L 2/84; A23L 2/02
USPC ........................................ 426/510
See application file for complete search history.

(56) References Cited

U.S. PATENT DOCUMENTS

| | | | |
|---|---|---|---|
| 4,755,467 A | 7/1988 | Scopes et al. | |
| 8,168,242 B2 * | 5/2012 | Henderson | ............... A23L 2/02 426/10 |
| 2013/0216652 A1 | 8/2013 | Sans-Valero et al. | |

OTHER PUBLICATIONS

Aziz, M. G. et al. Afric. J. Microbiol. Res. 5: 5046-5052 (2011) (Year: 2011).*
Tauscher, B. Z Lebensm Unters Forsch. 200: 3-13 (1995) (Year: 1995).*
M.G. Aziz et al., "Production and Application of Glucose-Fructose Oxidoreductase for Conversion of Pineaple Juice Sugars", African Journal of Microbiology Research vol. 5 (28), pp. 5046-5052, Nov. 30, 2011, http://www.academicjournals.org/AJMR, DOI: 10.5897/AJMR11.775.
R.J. Vega Paulino et al., "Potential Application of Commercial Enzyme Preparations for Industrial Production of Short-Chain Fructooligosaccharides", Journal of Molecular Catalysis B: Enzymatic 76(2012) 44-51, journal homepage:www.elsevier.com/locate molcatb.

* cited by examiner

*Primary Examiner* — Hamid R Badr
(74) *Attorney, Agent, or Firm* — Haverstock & Owens LLP

(57) ABSTRACT

The present invention provides a method to convert the intrinsic sugar of a juice into indigestible oligosaccharides (such as, low-polymerization fructose and sorbitol). The present method comprises using a *Zymomonas mobilis* biomass and fructosyltransferase as well as pressure treatment. Taking advantage of the present method, the drawbacks of drinking juices, such as too many sugar and calorie intake can be obviated, and thereby the present invention can offer healthier option to the consumers.

7 Claims, 1 Drawing Sheet

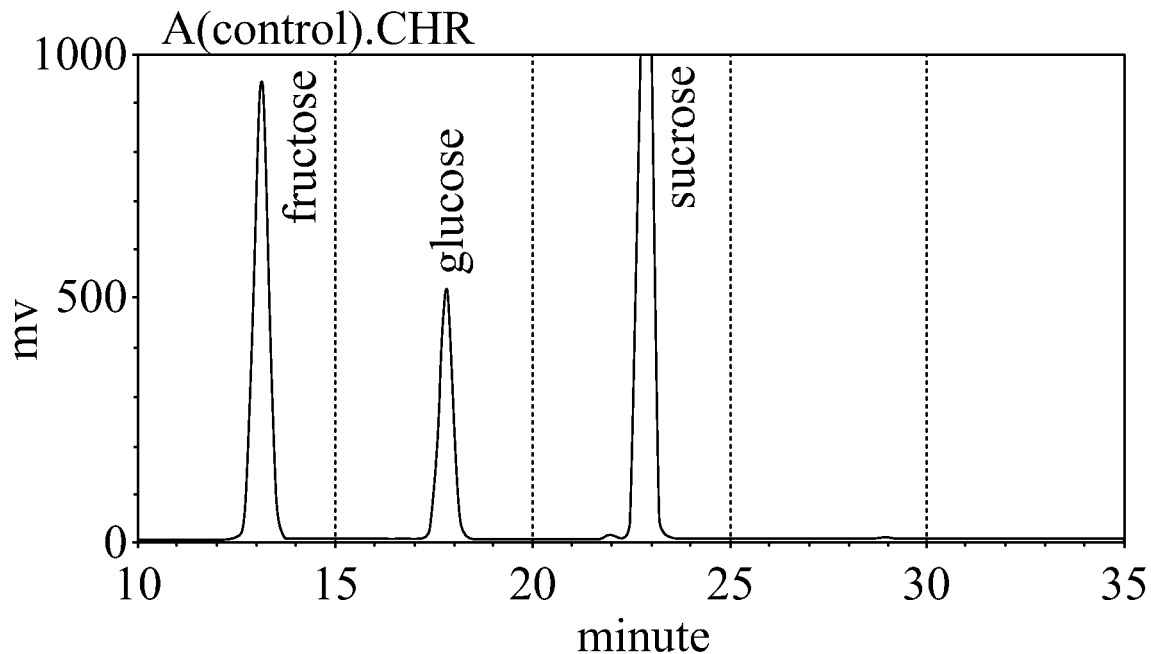
(A)
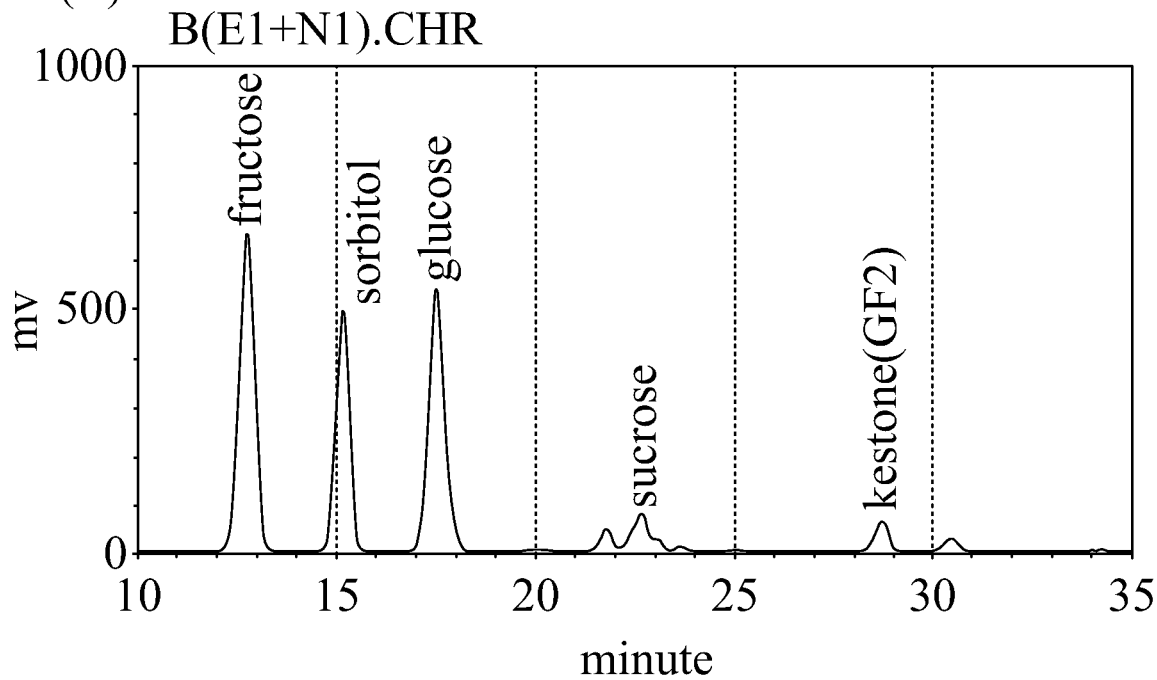
(B)

US 10,660,358 B2

METHOD FOR PRODUCING LOW-SUGAR-CONTENTS JUICE

BACKGROUND

Technical Field

The present invention is related to a method for preparing a low-sugar-contents juice, especially to a method for converting the intrinsic sugars contained in a juice into indigestible oligosaccharides and sorbitol.

Description of Related Art

From the perspective of Nutrition, juice is a good source of vitamin but has the drawbacks of high sugar content and high calorie. Thus, people may inadvertently uptake too many sugar and calorie while drinking juice.

In order to prevent from uptaking too many sugar and calorie, it is common in the field to dilute the sugar content of a juice by mixing with vegetable juice, which has relatively lower sugar content. Researchers also tried to remove the intrinsic sugar of juice by separation technology or bioconversion technology to obtain low-sugar-contents. For instance, in 1995, Black and Bray adopted a nanomembrane to separate the sugar molecule of juice to produce low-sugar-contents juice; and, in 1990, Strobel and Tarr adopted bioconversion technology to convert sucrose of concentrated juice into ethanol to produce low-sugar-contents juice.

Bioconversion technology can also be adopted to enzymatically digest sucrose into monosaccharide, which is then converted into oligosaccharide for the purpose of sugar reduction and increasing indigestible oligosaccharides. The common enzyme used for converting sucrose into fructooligosaccharides is transglycosidase, among which fructosyltransferase is the most commonly used. Sans-Valero and Cheng' research in 2013 used fructosyltransferase and glucosyltransferase to convert sugar into indigestible oligosaccharides. In 1986, Zachariou and Scopes used glucose-fructose oxidoreductase to convert sucrose into sorbitol for the benefit that sorbitol has lower calorie than sucrose has but has sweetness just slightly lower than sucrose; thus it is able to provide the sweet favor desired for the juice product.

To sum up, although there are several methods for preparing low-sugar-contents juice in the field, they are not ideal. In order to overcome the drawbacks of having high sugar and calorie, the field needs more researches.

SUMMARY

In light of the foregoing, the objective of the present invention is to provide a method for processing juice so that the glycemix index and calorie of the juice can be decreased.

Another objective of the present invention is to provide a low-sugar-contents juice, which can be a healthier option for the consumers.

In order to achieve the aforesaid objectives, the present invention provides a method for producing a low-sugar-contents juice, comprising the following steps: (A) obtaining a raw juice and a *Zymomonas mobilis* biomass; (B) mixing said raw juice, said *Zymomonas mobilis* biomass and a fructosyltransferase to obtain a mixture; wherein said mixture comprises: 0.2 to 2.0 weight percentage of *Zymomonas mobilis* biomass; and 0.02 to 5.0 weight percentage of said fructosyltransferase; wherein said weight percentage is based on the total weight of said mixture; (C) conducting a pressure treatment to said mixture at 200 to 600 MPa to obtain said low-sugar-contents juice; wherein a method for producing said *Zymomonas mobilis* biomass comprises the following steps: (a) obtaining a broth of *Zymomonas mobilis* from an anaerobic fermentation, wherein said broth of *Zymomonas mobilis* has an $OD_{560}$ absorption of 0.5 to 1.1 at 2× dilution; and (b) precipitating said broth of *Zymomonas mobilis* to obtain said *Zymomonas mobilis* biomass.

Preferably, a fermentation medium for said anaerobic fermentation comprises: 100 to 300 g glucose/L of medium; and 2 to 10 g yeast extract/L of medium; wherein said g/L is based on the total volume of said fermentation medium.

Preferably, the ambient environment of said anaerobic fermentation substantially has no oxygen.

Preferably, the intrinsic sugar content of said low-sugar-contents juice has a 20 to 65% reduction in comparison with that of said raw juice; wherein said intrinsic sugar comprises fructose, glucose, sucrose, or a combination thereof.

Preferably, said low-sugar-contents juice comprises sorbitol, kestose and intrinsic sugar; wherein a ratio of the sum of the weight percent of said sorbitol and said kestose to the weight percent of said intrinsic sugar is 0.17 to 0.60; wherein said weight percent is based on the total weight of said low-sugar-contents juice.

Preferably, said pressure treatment in said step (C) is conducted for 1 to 10 minutes.

Preferably, after said pressure treatment in said step (C), said mixture is placed at 10 to 35° C. for 1 to 28 days.

Preferably, said raw juice has a sugar content of 12 to 60° Brix.

Preferably, said *Zymomonas mobilis* biomass comprises glucose-fructose oxidoreductase; the specific activity of said glucose-fructose oxidoreductase is 4.8 to 5.8 U/gram *Zymomonas mobilis* biomass evaluated by gluconate acid assay at pH 6.4 and 39° C.

The present invention also provides a method for producing a low-sugar-contents juice, comprising the following steps: (A) obtaining a raw juice; (B) mixing said raw juice, said glucose-fructose oxidoreductase and a fructosyltransferase to obtain a mixture; wherein said mixture comprises: 0.0096 to 0.12 U/100 g of said glucose-fructose oxidoreductase, wherein said U/100 g is based on the total weight of said mixture; and 0.02 to 5.0 weight percentage of said fructosyltransferase, wherein said weight percentage is based on the total weight of said mixture; (C) conducting a pressure treatment to said mixture at 200 to 600 MPa to obtain said low-sugar-contents juice.

Preferably, the intrinsic sugar content of said low-sugar-contents juice has a 20 to 65% reduction in comparison with that of said raw juice; wherein said intrinsic sugar comprises fructose, glucose, sucrose, or a combination thereof.

Preferably, said low-sugar-contents juice comprises sorbitol, kestose and intrinsic sugar; wherein a ratio of the sum of the weight percent of said sorbitol and said kestose to the weight percent of said intrinsic sugar is 0.17 to 0.60; wherein said weight percent is based on the total weight of said low-sugar-contents juice.

Preferably, said pressure treatment in said step (C) is conducted for 1 to 10 minutes.

Preferably, after pressure treatment in said step (C), said mixture is placed at 10 to 35° C. for 1 to 28 days.

Preferably, said raw juice has a sugar content of 12 to 60° Brix.

The present invention further provides a raw material mixture of a low-sugar-contents juice, comprising: 0.02 to 5.0 weight percentage of said fructosyltransferase; 0.2 to 2.0 weight percentage of said *Zymomonas mobilis* biomass; and a raw juice for the remaining part thereof; wherein said weight percentage is based on the total weight of said raw material mixture of a low-sugar-contents juice; wherein a method for preparing producing said *Zymomonas mobilis* biomass comprises the following steps: (a) obtaining a broth of *Zymomonas mobilis* from an anaerobic fermentation, wherein said broth of *Zymomonas mobilis* has an $OD_{560}$ absorption of 0.5 to 1.1 at 2× dilution; and (b) precipitating said broth of *Zymomonas mobilis* to obtain said *Zymomonas mobilis* biomass.

Preferably, a fermentation medium for said anaerobic fermentation comprises: 100 to 300 g glucose/L of medium; and 2 to 10 g yeast extract/L of medium; wherein said g/L is based on the total volume of said fermentation medium.

Preferably, the ambient environment of said anaerobic fermentation substantially has no oxygen.

Preferably, said raw juice has a sugar content of 12 to 60° Brix.

Preferably, said raw juice is an orange juice, an apple juice, or a combination thereof.

The present invention more provides a juice composition, comprising: intrinsic sugar, sorbitol, kestose; wherein said intrinsic sugar comprises fructose, glucose, sucrose, or a combination thereof; wherein a ratio of the sum of the weight percent of said sorbitol and said kestose to the weight percent of said intrinsic sugar is 0.17 to 0.60; wherein said weight percentage is based on the total weight of said juice composition.

Preferably, said juice is an orange juice, an apple juice, or a combination thereof.

To sum up, the present invention provides a method to convert the intrinsic sugar contained in a juice into indigestible oligosaccharides (such as low-polymerization fructose and sorbitol). Through the present method, the drawback of having high sugar and calorie while drinking juice can be duly overcome; thus a healthier option can be provided for the consumers.

BRIEF DESCRIPTION OF THE DRAWINGS

FIG. 1 shows the HPLC spectrum of the experiment 1 of the Example 2 of the present invention: (A) raw juice; (B) the low-sugar-contents juice of the present invention.

DETAILED DESCRIPTION

In view of the high glycemic index and high calorie drawbacks of conventional juice products, the present invention provides a method to convert the intrinsic sugar into indigestible oligosaccharides (such as kestose) and sorbitol. The term "intrinsic sugar" used hereinafter is referred to as the polysaccharides contained in a natural juice or juice. In a preferable embodiment, said intrinsic sugar comprises fructose, glucose, sucrose, or a combination thereof.

One aspect of the present invention is related to a method for producing a low-sugar-contents juice. Said method comprises (A) obtaining a raw juice and a *Zymomonas mobilis* biomass; (B) mixing said raw juice, said *Zymomonas mobilis* biomass and a fructosyltransferase to obtain a mixture; wherein said mixture comprises: 0.2 to 2.0 weight percentage of said *Zymomonas mobilis* biomass and 0.02 to 5.0 weight percentage of said fructosyltransferase; wherein said weight percentage is based on the total weight of said raw juice; (C) conducting a pressure treatment to said mixture at 200 to 600 MPa to obtain said low-sugar-contents juice.

Another aspect of the present invention is related to a method for producing a low-sugar-contents juice. Said method comprises (A) obtaining a raw juice; (B) mixing said raw juice, a glucose-fructose oxidoreductase and a fructosyltransferase to obtain a mixture; wherein said mixture comprises: 0.0096 to 0.12 U/100 g of said glucose-fructose oxidoreductase, wherein said U/100 g is based on the total weight of said mixture; and 0.02 to 5.0 weight percentage of said fructosyltransferase, wherein said weight percentage is based on the total weight of said mixture; (C) conducting a pressure treatment to said mixture at 200 to 600 MPa to obtain said low-sugar-contents juice.

Another aspect of the present invention is related to a raw material mixture of a low-sugar-contents juice. Said raw material mixture of a low-sugar-contents juice might be considered as the staring material for preparing the present low-sugar-contents juice set forth above. Said raw material mixture of a low-sugar-contents juice comprises: 0.02 to 5.0 weight percentage of said fructosyltransferase; 0.2 to 2.0 weight percentage of a *Zymomonas mobilis* biomass; and a raw juice for the remaining part thereof.

Another aspect of the present invention is related to a juice composition (or named as a low-sugar-contents juice). In an alternative embodiment, said juice composition is prepared by the present method for producing a low-sugar-contents juice set forth above. In an alternative embodiment, said juice composition is prepared by processing the present raw material mixture of a low-sugar-contents juice through the present method set forth above. Said juice might be an orange juice, an apple juice, or a combination thereof. In an alternative embodiment, said juice comprises intrinsic sugar, sorbitol, and kestose; wherein said intrinsic sugar comprises fructose, glucose, sucrose, or a combination thereof; wherein a ratio of the sum of the weight percent of said sorbitol and said kestose to the weight percent of said intrinsic sugar is 0.17 to 0.60.

The term of "raw juice" used hereinafter is defined relatively to the present low-sugar-contents juice. In other words, said "raw juice" might be defined as a juice that has never been processed by the present method. In an alternative embodiment, said raw juice has a sugar content of 12 to 60° Brix. In another alternative embodiment, said raw juice is an orange juice, an apple juice or a combination thereof.

The term of "biomass" used hereinafter is referred to as a precipitate obtained by centrifugation of a fermentation broth. Through the centrifugation, the sedimented parts (most of them are bacteria cell therein) of the broth can be separated from the liquid parts thereof. Therefore, said precipitate is substantially consisted of the bacteria contained in the broth. Additionally, substances contained in or with said bacteria (such as the polysaccharide, lipid, proteins, etc. in the bacteria) would also be included in said precipitate. In an alternative embodiment, said precipitate (ie, said biomass of the present invention) might be re-suspended in a suitable liquid. Said suitable liquid includes but no limits to water, PBS, peptone solution, or sodium chloride solution.

Without being bound by theory, the present invention asserts *Zymomonas mobilis* in anaerobic fermentation would secrete enzymes that are able to convert fructose, glucose, and/or sucrose to high glycemic index sugar. In an alternative embodiment, a method for producing said *Zymomonas mobilis* biomass comprises the following steps: (a) obtaining a broth of *Zymomonas mobilis* from an anaerobic fermentation, wherein said broth of *Zymomonas mobilis* has an $OD_{560}$ absorption of 0.5 to 1.1 at 2× dilution; and (b) precipitating said broth of *Zymomonas mobilis* to obtain said *Zymomonas mobilis* biomass. Those having ordinary skill in the art would be able to adjust the conditions of said anaerobic fermentation based on the common knowledge in the field. Nevertheless, the present invention concluded that, in an alternative embodiment, said anaerobic fermentation uses a fermentation medium comprising 100 to 300 g glucose/L of medium; and 2 to 10 g yeast extract/L of medium. In a preferable embodiment, the ambient environment of said anaerobic fermentation substantially has no oxygen.

In an alternative embodiment, the activity of said glucose-fructose oxidoreductase is determined by using a conventional gluconic acid determination kit (D-gluconic acid assay kit, K68.-100, BioVision Inc., USA) and by referring to the method taught by Erzinger et al. (2003).

In a preferable embodiment, said *Zymomonas mobilis* biomass comprises glucose-fructose oxidoreductase and the specific activity of said glucose-fructose oxidoreductase is 4.8 to 5.8 U/gram *Zymomonas mobilis* biomass evaluated by a gluconate acid assay at pH 6.4 and 39□.

Without being bound by theory, the present invention showed that the pressure treatment is favorable to facilitate the activities of the fructosyltransferase and/or the enzymes in the *Zymomonas mobilis* biomass. Preferably, said pressure treatment is also desirable as it could offer sterilization so that the low-sugar-contents juice prepared by the present invention can be stored for longer time without using preservative.

In an alternative embodiment, said pressure treatment of step (C) is conducted for 1 to 10 minutes. In an alternative embodiment, after said pressure treatment in said step (C), the method further comprises a step of placing said mixture at 10 to 35° C. (preferably, 18 to 25° C.) for 1 to 28 days. In a preferable embodiment, said pressure treatment is conducted at 200 to 600 MPa.

In a preferable embodiment, after being processed by the method of the present invention, the intrinsic sugar content of said low-sugar-contents juice has a 20 to 65% reduction in comparison with that of said raw juice. The reduction of said intrinsic sugar content was calculated by the following formula:

[(the total weight of the intrinsic sugar contained in the raw juice)−(the total weight of the intrinsic sugar contained in the low-sugar-contents juice)/(the total weight of the intrinsic sugar contained in the raw juice)]×100%

In another preferable embodiment, said low-sugar-contents juice comprises 0.9 to 10.2 weight percentage of sorbitol and 0.5 to 3.8 weight percentage of kestose; wherein said weight percent is based on the total weight of said low-sugar-contents juice.

Experiment 1

Preparation of the *Zymomonas mobilis* Biomass Used in the Present Invention

First of all, the fermentation medium and culture plate were prepared. Said fermentation medium (1000 mL) contained 200 g of glucose, 5 g of yeast extract, 0.5 g of $KH_2PO_4$, 0.02 g of $MgSO_4.7H_2O$, 0.02 g of $Fe(NH_4)_2(SO_4)_2.6H_2O$, 0.001 g of biotin and 0.002 of vitamin B5 (calcium pantothenate). Said culture plate contained the same composition as said fermentation medium did and contained additional 1.5 to 2.0 weight percentage of agar for solidification.

*Zymomonas mobilis* (*Zymomonas mobilis* subsp. *mobilis*, BCRC 10809 or 80839) was inoculated on a culture plate and incubated at 35□ overnight. The ambient environment of the incubation substantially had no oxygen; ie. anaerobic fermentation). The colony on the plate was picked and re-suspended in 10 ml of fresh fermentation medium and the fermentation medium was then mixed with another 100 ml of fresh fermentation medium. Afterward, the fermentation medium was incubated in anaerobic environment at 35□ for 22 hours. Then, 1000 ml of fresh fermentation medium was added and the fermentation was continued in anaerobic environment at 35□ for another 22 hours. Lastly, the broth was collected and centrifugation (10,000 rpm, 30 minutes, J2-MC Centrifuge, Rotor J14, Beckman, Germany) was performed. The supernatant was discarded. Sterilized NaCl (0.85%) solution was added to re-suspend the pellet. Then, another centrifugation (10,000 rpm, 30 minutes) was performed. The supernatant was again discarded and the pellet was collected. The pellet was the biomass used in the present invention.

In reference of the methodology taught by Erzinger et al. (2003), the above-obtained biomass (20% (w/w)) was taken from the freezer and thawed. Then, 1 M of phosphate/citrate buffer (pH 6.4) was added to dilute the biomass to 0.05% (w/w), which was used as a crude enzyme solution. Then a 0.8 M glucose substrate solution and a 0.8 M fructose substrate solution were prepared respectively by using the same buffer. 0.4 ml of said 0.05% crude enzyme solution and 1.6 ml of said substrate solution were mixed for reaction at 39° C. for 20 minutes. Then the mixture was placed in boiling water for 5 minutes and iced immediately thereafter. After that, the mixture was introduced into a 3K protein concentration centrifugation tube. Elution was collected after centrifugation and examination was conducted by using a gluconic acid determination kit (D-gluconic acid assay kit, K68.-100, BioVision Inc., USA) to analyze the amount of gluconic acid produced during the reaction.

It was defined in this Experiment 1 that 1 U of the activity of glucose-fructose oxidoreductase was able to enzymatically produce 1 g of gluconic acid at pH 6.4 and 39° C. per hour. The specific activity (U/gram of the biomass) of the wet biomass prepared in the Experiment 1 was defined as the activity of the glucose-fructose oxidoreductase contained in per gram of the biomass. According to the analysis, the specific activities of the biomass of BCRC 10809 and BCRC 80839 were 5.8±0.1 and 4.8±0.2 U/gram of the biomass respectively. According to the amount of the *Zymomonas mobilis* biomass added, the aforesaid specific activities were used for calculating the activity of the glucose-fructose oxidoreductase of the biomass in the method of the present invention.

Experiment 2

The Effect of the Usage of *Zymomonas mobilis* Biomass on the Method of the Present Invention In the Example 1 and Example 2, an orange juice (that is, the raw juice) of 12° Brix was added with fructosyltransferase and the *Zymomonas mobilis* biomass (BCRC 80839) prepared in the Experiment 1 to obtain the raw material mixture of a low-sugar-contents juice. The formulations of the two examples were listed in the following Table 1. The raw material mixture of a low-sugar-contents juice was treated with pressure of 600 MPa for 3 minutes and then placed at 20° C. for 7 days to obtain the low-sugar-contents juice of the present invention.

In the Example 3, an orange juice (that is, the raw juice) of 53° Brix was added with fructosyltransferase and the *Zymomonas mobilis* biomass (1.0% (w/w), BCRC 10809)

prepared in the Experiment 1 to obtain the raw material mixture of a low-sugar-contents juice. The formulations of the two examples were listed in the following Table 1. The raw material mixture of a low-sugar-contents juice was treated with pressure of 600 MPa for 3 minutes and then placed at 20° C. for 7 days to obtain the low-sugar-contents juice of the present invention.

Then, high performance liquid chromatography (Hitachi HPLC system; analysis column: Shodex NH2P-50 4E; detection: ELSD; liquid phase: acetonitrile/water solution) was performed to compare the polysaccharide contained respectively in the raw juice and the low-sugar-contents juice of the present invention.

The result of the HPLC was shown in the following Table 2 and FIG. 1. According to the results, the Example 3 exhibited the best conversion rate (57.3%) of intrinsic sugar among the three examples. The usage of 0.25% (w/w) or 0.5% (w/w) of Zymomonas mobilis biomass did not dramatically affect the efficiency of the present method. Both of the two examples (Examples 1 and 2) achieved the objective of converting the intrinsic sugar of the raw juice. Besides, the ratios of the sum of the weight percent of said sorbitol and said kestose to the weight percent of said intrinsic sugar were 0.20, 0.24 and 0.60 respectively in the three examples.

TABLE 1

| Example | raw juice | fructosyltrans-ferase | Zymomonas mobilis biomass |
|---|---|---|---|
| Example 1 | reconstituted orange juice (12° Brix) | 0.05% (w/w) | 0.25% (w/w) |
| Example 2 | reconstituted orange juice (12° Brix) | 0.05% (w/w) | 0.5% (w/w) |
| Example 3 | reconstituted orange juice (53° Brix) | 0.05% (w/w) | 1.0% (w/w) |

TABLE 2

| Example | fructose | glucose | sucrose | sorbitol | kestose | conversion rate (%) | ratio |
|---|---|---|---|---|---|---|---|
| untreated | 3.3 | 3.2 | 3.1 | ND | ND | n/a | 0 |
| Example 1 | 3.4 | 3.5 | 0.5 | 1.0 | 0.5 | 23 | 0.20 |
| Example 2 | 3.0 | 3.1 | 0.5 | 1.1 | 0.5 | 31 | 0.24 |
| Example 3 | 7.5 | 10.1 | 1.2 | 10.2 | 1.0 | 57.3 | 0.60 |

Conversion rate: intrinsic sugar conversion rate (%).
Ratio: the ratio of the sum of the weight percent of said sorbitol and said kestose to the weight percent of said intrinsic sugar.
The unit of the sugar in this Table is: g/100 g low-sugar-contents juice.

Experiment 3

The Effect of High Pressure Treatment on the Method of the Present Invention

An orange juice (that is, the raw juice; pH 5.5) of 53° Brix was added with 0.05% (w/w) of fructosyltransferase and 0.25% (w/w) of the Zymomonas mobilis biomass (BCRC 10809) prepared in the Experiment 1 to obtain the raw material mixture of a low-sugar-contents juice. The raw material mixture of a low-sugar-contents juice was treated with pressure of 600 MPa for 3 minutes or untreated and then placed at 20° C. for days to obtain the low-sugar-contents juice of the present invention. Lastly, the same methodology set forth in the Experiment 1 was conducted to determine the concentration of intrinsic sugar. The results were shown in the following Table 3.

TABLE 3

|  | Concentration[1] of intrinsic sugar | | intrinsic sugar reduction rate (%) | | the ratio[2] | |
|---|---|---|---|---|---|---|
|  | 9-days Reaction | 14-days Reaction | 9-days Reaction | 14-days Reaction | 9-days Reaction | 14-days Reaction |
| untreated | 33.2 | 31.4 | 33.7 | 37.3 | 0.17 | 0.19 |
| pressure treated | 30.7 | 28.4 | 38.7 | 43.3 | 0.17 | 0.20 |

[1]g/100 g low-sugar-contents juice
[2]the ratio of the sum of the weight percent of said sorbitol and said kestose to the weight percent of said intrinsic sugar According to the results, the group treated with high pressure and placed for 9-days reaction exhibited intrinsic sugar reduction rate even better than the group of 14-days reaction but without pressure treatment. In other words, while using the same weight percentage of enzyme, high pressure treatment was able to decrease the required reaction time. Further investigation indicated that the low-sugar-contents juice prepared by the present invention had pH of 3.8, which was lower than that of the raw juice. The investigation of pH suggested that the intrinsic sugar was converted into gluconic acid through the method of the present invention. The acidity was acceptable but a proper adjustment by adding some sweetener would be more favorable.

Furthermore, an orange juice (that is, the raw juice; pH 5.5) of 53° Brix was added with 0.05% (w/w) of fructosyltransferase and 0.5% (w/w) of the Zymomonas mobilis biomass (BCRC 80839) prepared in the Experiment 1 to obtain the raw material mixture of a low-sugar-contents juice. The raw material mixture of a low-sugar-contents juice was treated with pressure of 200 MPa for 1 or 10 minutes or treated with pressure of 450 MPa for 1 or 10 minutes or treated with pressure of 600 MPa for 1, 3 or 10 minutes and then placed at 20° C. for 7 days to obtain the low-sugar-contents juice of the present invention. The results shown in the following Table 4 indicated that the intrinsic sugar reduction rate was between 45 to 49%. In addition, every 100 g of the low-sugar-contents juice contained 7.0 to 7.5 g of sorbitol and 2.5 to 2.9 g of fructooligosaccharides (FOS). The experiment confirmed that the pressure treatment of 200 to 600 MPa for 1 to 10 minutes was able to achieve the effect desired for the present invention.

TABLE 4

| Condition | intrinsic sugar reduction rate (%) | Sorbitol[1] | FOS[1] | the ratio[2] |
|---|---|---|---|---|
| 200 MPa for 1 min. | 48.1 | 7.1 | 2.6 | 0.39 |
| 200 MPa for 10 min. | 47.7 | 7.2 | 2.7 | 0.40 |
| 450 MPa for 1 min. | 49.1 | 7.2 | 2.5 | 0.40 |
| 450 MPa for 10 min. | 49.5 | 7.1 | 2.7 | 0.42 |
| 600 MPa for 1 min. | 46.4 | 7.3 | 2.8 | 0.39 |
| 600 MPa for 3 min. | 45.3 | 7.5 | 2.9 | 0.40 |
| 600 MPa for 10 min. | 47.9 | 7.0 | 2.6 | 0.39 |

[1]g/100 g low-sugar-contents juice.
[2]the ratio of the sum of the weight percent of said sorbitol and said kestose to the weight percent of said intrinsic sugar.

Experiment 4

The Effect of Various Concentration of Fructosyltransferase on the Method of the Present Invention An orange juice (that is, the raw juice; pH 5.5) of 53° Brix was added with fructosyltransferase (0.05% (w/w), 0.5% (w/w), or 5.0% (w/w)) and 0.5% (w/w) of the *Zymomonas mobilis* biomass (BCRC 10809) prepared in the Experiment 1 to obtain the raw material mixture of a low-sugar-contents juice. The raw material mixture of a low-sugar-contents juice was treated with pressure of 600 MPa for 3 minutes or untreated and placed at 20° C. for 7 days to obtain the low-sugar-contents juice of the present invention. Lastly, the same methodology set forth in the Experiment 1 was conducted to determine the concentration of intrinsic sugar. The results were shown in the following Table 5.

TABLE 5

| | intrinsic sugar reduction rate (%) | |
|---|---|---|
| Concentration of fructosyltransferase | w/pressure treatment | w/o pressure treatment |
| 0.05% (w/w) | 32.7 | — |
| 0.5% (w/w) | 38.1 | 25.5 |
| 5.0% (w/w) | 45.3 | 33.6 |

According to the data shown in the table, the higher the concentration of fructosyltransferase, the higher the intrinsic sugar reduction rate was. It was also noted that the pressure treatment increased the activity of fructosyltransferase. According to the comparison between the 0.5% (w/w) group and the 5.0% (w/w) group, the pressure treatment was able to increase the activity of fructosyltransferase to 10-fold.

Experiment 5

The Effect of the Intrinsic Sugar Content of the Raw Juice on the Method of the Present Invention A concentrated orange juice (that is, the raw juice; pH 5.5) was formulated as the experimental groups of 12.6° Brix and 33° Brix respectively. Then, 0.05% (w/w) of fructosyltransferase and 0.5% (w/w) of the *Zymomonas mobilis* biomass (BCRC 10809) prepared in the Experiment 1 were added to obtain the raw material mixture of a low-sugar-contents juice. The raw material mixture of a low-sugar-contents juice was treated with pressure of 600 MPa for 3 minutes or untreated and placed at 20° C. for 7 days to obtain the low-sugar-contents juice of the present invention. Lastly, the same methodology set forth in the Experiment 1 was conducted to determine the concentration of the intrinsic sugar therein. The results were shown in the following Table 6. The results showed that no matter the concentration of the intrinsic sugar of the raw juice used, the present invention was able to achieve at least 30% of intrinsic sugar reduction rate.

TABLE 6

| Sweetness of raw juice (° Brix) | pH | intrinsic sugar reduction rate (%) | Sorbitol[1] | Kestose[1] | the ratio[2] |
|---|---|---|---|---|---|
| 12.6 | 5.5 | 31.4 | 1.1 | 0.5 | 0.24 |
| 33 | 5.5 | 30.7 | 3.6 | 0.6 | 0.25 |

[1]g/100 g low-sugar-contents juice.
[2]the ratio of the sum of the weight percent of said sorbitol and said kestose to the weight percent of said intrinsic sugar.

Experiment 6

The Stability of the Low-Sugar-Contents Juice Prepared by the Present Invention

An orange juice (that is, the raw juice; pH 5.5) of 53° Brix was added with 0.05% (w/w) of fructosyltransferase and 1.0% (w/w) of the *Zymomonas mobilis* biomass (BCRC 80839) prepared in the Experiment 1 to obtain the raw material mixture of a low-sugar-contents juice. The raw material mixture of a low-sugar-contents juice was treated with pressure of 600 MPa for 3 minutes or untreated and placed at 20° C. for 14 days to obtain the low-sugar-contents juice of the present invention. Then, the low-sugar-contents juice was stored at 7° C. for 28 days. The intrinsic sugar contents of the fresh-made low-sugar-contents juice and the one had been stored for 28 days were analyzed and the results thereof were compared in the following Table 7.

Lastly, the same methodology set forth in the Experiment 1 was conducted to determine the concentration of the intrinsic sugar therein. The results were shown in the following Table 3. According to the data, the low-sugar-contents juice prepared by the present invention was quite stable. The sugar contents of the low-sugar-contents juice showed no significant change after 28-day storage. Further investigation revealed that the bacteria contained in the low-sugar-contents juice of 28-day storage was lower than 100 CFU/g, which complied with the hygiene standard set for juice products (ie. lower than 200 CFU/g).

TABLE 7

| Storage (day) | intrinsic sugar[1] | Sorbitol[1] | Kestose[1] | the ratio[2] |
|---|---|---|---|---|
| 0 | 17.8 | 8.1 | 1.2 | 0.51 |
| 28 | 18.4 | 7.8 | 1.2 | 0.50 |

[1]g/100 g low-sugar-contents juice.
[2]the ratio of the sum of the weight percent of said sorbitol and said kestose to the weight percent of said intrinsic sugar.

What is claimed is:
1. A method for producing a low-sugar-contents juice, comprising the following steps:
(A) obtaining a raw juice and a *Zymomonas mobilis* biomass;
(B) mixing said raw juice, said *Zymomonas mobilis* biomass and a fructosyltransferase to obtain a mixture; wherein said mixture comprises:
0.2 to 2.0 weight percentage of said *Zymomonas mobilis* biomass; and

0.02 to 5.0 weight percentage of said fructosyltransferase;

(C) conducting a pressure treatment to said mixture at 200 to 600 MPa to obtain said low-sugar-contents juice;

wherein a method for preparing said *Zymomonas mobilis* biomass comprises the following steps:

(a) obtaining a broth of *Zymomonas mobilis* from an anaerobic fermentation, wherein said broth of *Zymomonas mobilis* has an $OD_{560}$ of 0.5 to 1.1 at 2× dilution; and (b) precipitating said broth of *Zymomonas mobilis* to obtain said *Zymomonas mobilis* biomass.

2. The method of claim 1, wherein a fermentation medium for said anaerobic fermentation comprises:

100 to 300 g glucose/L of medium; and 2 to 10 g yeast extract/L of medium.

3. The method of claim 1, wherein, the intrinsic sugar content of said low-sugar-contents juice has a reduction of 20 to 65% in comparison with that of said raw juice; wherein said intrinsic sugar comprises fructose, glucose, sucrose, or a combination thereof.

4. The method of claim 1, wherein said low-sugar-contents juice comprises sorbitol, kestose and intrinsic sugar; wherein a ratio of the sum of the weight percent of said sorbitol and said kestose to the weight percent of said intrinsic sugar is 0.17 to 0.60.

5. The method of claim 1, wherein said pressure treatment in said step (C) is conducted for 1 to 10 minutes.

6. The method of claim 1, wherein said raw juice has a sugar content of 12 to 60° Brix.

7. The method of claim 1, wherein said *Zymomonas mobilis* biomass comprises glucose-fructose oxidoreductase; the specific activity of said *Zymomonas mobilis* biomass is 4.8 to 5.8 U/gram *Zymomonas mobilis* biomass evaluated by a gluconate acid assay at pH 6.4 and 39° C.

* * * * *